United States Patent
Gern et al.

(10) Patent No.: US 9,712,971 B2
(45) Date of Patent: Jul. 18, 2017

(54) AUTOMATIC LOCATION ADDRESS TRANSLATION AND LESS ACCURATE LOCATION TECHNOLOGY ADDRESS TO MORE ACCURATE LOCATION TECHNOLOGY ADDRESS TRANSLATION

(71) Applicant: Freeus, LLC, Ogden, UT (US)

(72) Inventors: Justin Gern, Cary, NC (US); Tom Collopy, Cary, NC (US)

(73) Assignee: FREEUS, LLC, Odgen, UT (US)

( * ) Notice: Subject to any disclaimer, the term of this patent is extended or adjusted under 35 U.S.C. 154(b) by 208 days.

(21) Appl. No.: 14/341,388

(22) Filed: Jul. 25, 2014

(65) Prior Publication Data

US 2015/0038175 A1    Feb. 5, 2015

Related U.S. Application Data

(60) Provisional application No. 61/861,103, filed on Aug. 1, 2013.

(51) Int. Cl.
 *H04W 24/00* (2009.01)
 *H04W 4/02* (2009.01)
 *H04W 4/04* (2009.01)

(52) U.S. Cl.
 CPC ........... *H04W 4/023* (2013.01); *H04W 4/021* (2013.01); *H04W 4/043* (2013.01)

(58) Field of Classification Search
 CPC .................................................... H04W 4/023
 See application file for complete search history.

(56) References Cited

U.S. PATENT DOCUMENTS

| | | | |
|---|---|---|---|
| 2011/0148699 A1* | 6/2011 | Anderson | G01S 19/34 342/357.31 |
| 2014/0313035 A1* | 10/2014 | Holzapfel | G08B 13/1427 340/568.6 |

\* cited by examiner

*Primary Examiner* — Justin Lee
(74) *Attorney, Agent, or Firm* — Baker & Hostetler LLP

(57) ABSTRACT

Methods and systems for translating technology relevant addresses to user relevant addresses, and for translating less accurate location addresses to more accurate location addresses, are provided. According to a first embodiment, a method for displaying location information relating to a mobile device comprises using received signal information to identify a specific transmitter; determining a location of the identified transmitter; determining a Technology Relevant Address; calculating an Error Radius; translating the Technology Relevant Address to a User Relevant Address; recalculating the Error Radius; and displaying the User Relevant Address. According to a second embodiment, the method comprises using a first, less accurate technology, receiving signal information and using the received signal information to identify a specific transmitter; determining the location of the identified transmitter; calculating an Error Radius; determining if there is a More Accurate Technology Location Address within the Error Radius that is less than some time period old; translating the Less Accurate Technology Address to the More Accurate Technology Address; and displaying the User Relevant Address.

3 Claims, 5 Drawing Sheets

AUTOMATIC LOCATION ADDRESS TRANSLATION AND LESS ACCURATE LOCATION TECHNOLOGY ADDRESS TO MORE ACCURATE LOCATION TECHNOLOGY ADDRESS TRANSLATION

CROSS REFERENCE TO RELATED APPLICATIONS

The present application claims the benefit of U.S. Provisional Application No. 61/861,103, filed Aug. 1, 2013, entitled "Automatic Location Address Translation and Less Accurate Location Technology Address to More Accurate Location Technology Address Translation," which is hereby incorporated by reference in its entirety.

TECHNICAL FIELD

The present invention relates generally to the field of wireless location, and more particularly to methods and systems for translating technology relevant addresses to user relevant addresses, and for translating less accurate location addresses to more accurate location addresses.

SUMMARY

The present invention provides methods and systems for translating technology relevant addresses to user relevant addresses, and for translating less accurate location addresses to more accurate location addresses. According to a first illustrative embodiment, an improved method is provided for displaying location information on a mobile device capable of receiving signals from one or more transmitters. The inventive method comprises the steps of using received signal information to identify a specific transmitter; determining a location of the identified transmitter; determining a Technology Relevant Address based on the transmitter location; calculating an Error Radius surrounding the Technology Relevant Address; translating the Technology Relevant Address to a User Relevant Address; recalculating the Error Radius; and displaying the User Relevant Address and recalculated Error Radius on the mobile device. The present invention is not limited to displaying locations only on mobile devices. For example, the location information could be displayed on any device that can receive information for display. The location information can also be included in communications such as text messages and emails. Moreover, the device that receives the translated location information does not have to be the same device that is being located.

According to a second illustrative embodiment, an improved method for displaying location information on the mobile device comprises the steps of using a first, less accurate technology, receiving signal information and using the received signal information to identify a specific transmitter; determining the location of the identified transmitter; calculating an Error Radius surrounding the location of the identified transmitter; using the Error Radius, determining if there is a More Accurate Technology Location Address within the Error Radius surrounding the location of the identified transmitter that is less than some time period old; if there is a More Accurate Technology Location Address, translating the device location from the Less Accurate Technology Address to the More Accurate Technology Address and recalculating the Error Radius; and displaying the User Relevant Address and recalculated Error Radius.

In another illustrative embodiment, a mobile device is provided. The inventive mobile device includes a cellular receiver, a WiFi receiver, a GPS receiver, a processor, and a display. In this embodiment, the processor is configured to perform the steps recited above for displaying location information relating to the mobile device. The mobile device could be a product that has no display. The mobile device in this case would be located using location technologies of varying precision such as cell locate, GPS, WiFi, and the device that receives information about the location of the mobile device could be a cell phone, computer display, or other device that can display the contents of electronic messages.

Other features of the invention are described below.

DETAILED DESCRIPTION OF ILLUSTRATIVE EMBODIMENTS

As discussed above, the present invention provides methods and systems for translating technology relevant addresses to user relevant addresses, and for translating less accurate location addresses to more accurate location addresses. These aspects of the invention are described below.

Technology Relevant Address to User Relevant Address Translation

There are many different technologies in use today that provide the location of an electronic device. These technologies include but are not limited to GPS, WiFi and cellular. These location technologies are used to translate the raw location information such as latitude and longitude for GPS or WiFi hotspot signal strength and MAC address, or distance to a cellular tower, into a Technology Relevant Address. The resulting Technology Relevant Address has meaning to the location technology employed but may have little or no meaning to the user of the device. For example, if the address of a cell tower is given to a user, they may not recognize it as being close to a location they do recognize.

There are systems in place today that capture Relevant User Addresses. These relevant addresses include but are not limited to home address, work address, address of friends or relatives, address of frequently visited places such as a doctor's office, etc. The ability to translate Technology Relevant Addresses into User Relevant Addresses is the basis of the present invention.

An example of this address translation is described below. Some cellular location technologies are based on the ability of an electronic device to detect the electronic signals being transmitted by cell towers in the vicinity of the device. In this example, the signal information is used to determine the closest cell tower location. In addition, an error radius is also
} calculated that indicates that the device is somewhere within that error radius of the cell tower. In the case of all location technologies, there is a margin of error that could be as small as a few yards to as large as over a mile. This margin of error can produce Technology Relevant Addresses that do not have any significance for the user. In addition, Technology Relevant Addresses can also be produced when the address returned is something generally unknown to the user, such as the address of a cell tower.

The present invention uses the error margin of the location technology to determine if there is a Relevant User Address within the margin of error of the location technology. If there is a Relevant User Address, the Technology Relevant Address is translated to the Relevant User Address and the error margin is recalculated based on the error radius of the Technology Relevant Address and the distance between the Relevant User Address and the Technology Relevant Address. This translation puts the address into terms the user recognizes and therefore allows the user to immediately understand, within the error radius, where the location device is located.

Figure 1:
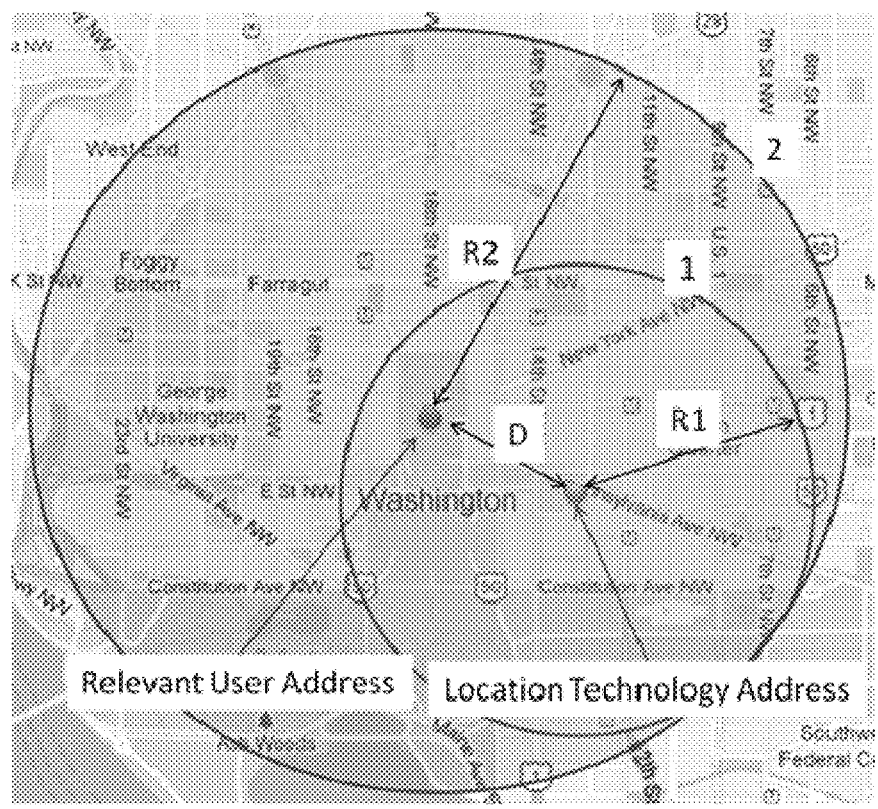
FIG. 1 is an illustration of location technology address to relevant user address translation in accordance with a first aspect of the present invention.

An example of this translation is illustrated in FIG. 1. The example is independent of location technology. Every location technology has an error margin that is usually described as a radius but can be any geometry. In the example depicted, we use the White House as the Relevant User Address, i.e., we are assuming the president is carrying a device that provides information on his location. In this example, the location technology is able to provide the address of a cell tower (the Location Technology Address) and an error radius. The technology is indicating that the device the president is carrying is somewhere within a circle #1 of Radius R1. This same information can be translated to indicate that the president is somewhere within a circle #2 of Radius R2, where R2=R1+D, with D being the distance between the center of circle R1 and the center of circle R2. The address of circle #2 is relevant to the user; the address of circle #1 is not as relevant and may be completely foreign to the user since it may be a street name the user does not recognize. This helps people understand more quickly the general area in which a device is located since they will immediately recognize where the center of the circle is.

The present invention applies to all location technologies with an error margin. This includes but is not limited to GPS, WiFi, and Cellular.

Figure 1A:
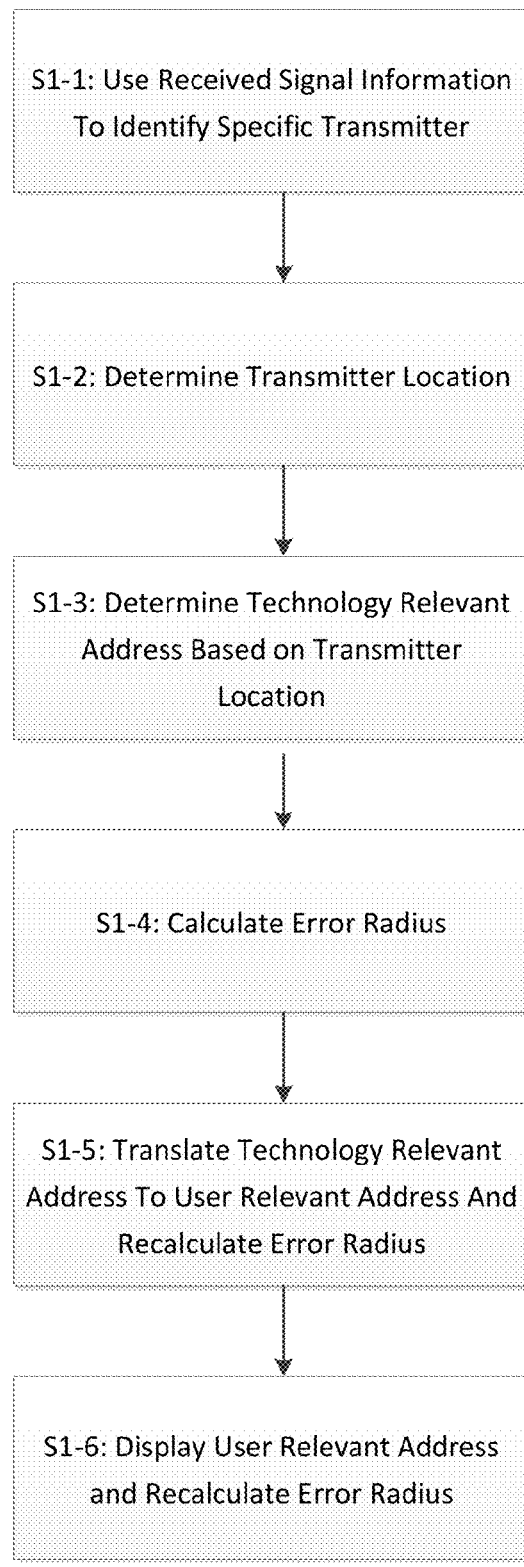
FIG. 1A is a flowchart depicting an illustrative method for technology address to relevant user address translation.

FIG. 1A is a flowchart that summarizes the process described above. As shown, the process includes steps S1-1 through S1-6:

S1-1: Use received signal information to identify a specific transmitter (e.g., a closest cell site or closest WiFi access point).

S1-2: Determine the location of the identified transmitter. For example, this may be accomplished using a publicly available database that maps transmitter identifiers to geographic locations.

S1-3: Determine a Technology Relevant Address based on the transmitter location found in step S1-2.

S1-4: Calculate an Error Radius surrounding the Technology Relevant Address.

S1-5: Translate the Technology Relevant Address to a Relevant User Address, and recalculate the Error Radius. As discussed above, this recalculation may be based on the distance separating the Technology Relevant Address and the User Relevant Address.

S1-6: Display the User Relevant Address and recalculated Error Radius to the user.

Less Accurate Location Technology Address to More Accurate Location Technology Address Translation As mentioned, there are many different technologies in use today that provide the location of an electronic device. These technologies include but are not limited to GPS, WiFi and cellular. These location technologies are used to translate the raw location information, such as latitude and longitude for GPS, WiFi hotspot signal strength and MAC address, or distance to a cellular tower, into a Technology Address. These resulting Technology Addresses have varying degrees of accuracy. In general, cell technologies are less accurate than WiFi, and WiFi is generally less accurate than GPS. However, there are times when a more accurate technology is currently unavailable due to signal loss.

For example, when a user takes a phone with GPS and cell location technologies available to it indoors, the GPS signal from the GPS satellites may be lost but the cellular signals are still available. At the point at which the GPS signal is lost the Last GPS Location Address can be captured. This address has a high probability of being a more representative address of the device than the cell tower based address for some period of time. This invention is designed to translate the address given to the user of the device from the Less Accurate Technology Address to the More Accurate Technology Address for a selectable period of time. This translation gives the More Accurate Technology Address to the user instead of the Less Accurate Technology Address for some period of time because it has a higher probability of being more accurate.

An example of this address translation is described below. As background for the example, some cellular location technologies are based on the ability of an electronic device to detect the electronic signals being transmitted by cell towers in the vicinity of the device. In this example, the signal information is used to determine the closest cell tower location to the location of the device. In addition, an error radius is also calculated that indicates that the device is somewhere within that error radius of the cell tower. A second technology is also employed that is more accurate, for example GPS. Typically Cell Tower error Radii is measured in the hundreds to thousands of yards. GPS error Radii are typically measured in single to double digit yards.

This aspect of the present invention uses the error margin of the Less Accurate Location Technology to determine if there is a More Accurate Technology Location within the margin of error of the location technology that is less than some time period old. If there is a More Accurate Technology Location Address, the device location is translated from the Less Accurate Technology Address to the More Accurate Technology Address and the error margin is re-calculated based on the error radius of the Less Accurate Technology Address and the distance between the More Accurate and Less Accurate Technology Addresses. This translation creates an Address with a higher probability of being closer to the device than the Less Accurate Technology Address but only for a limited amount of time.

Figure 2:
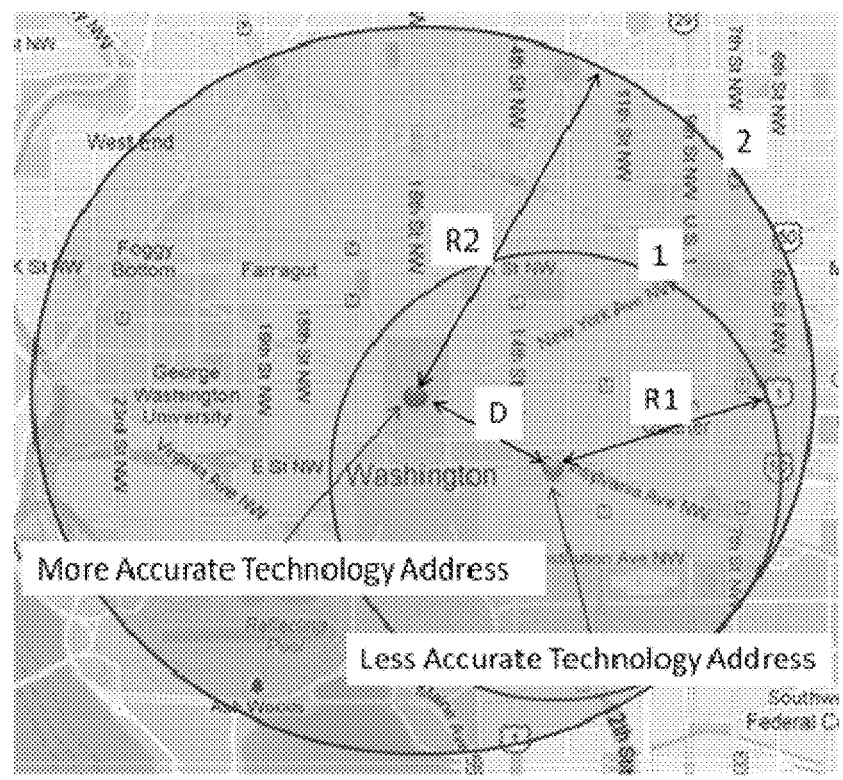
FIG. 2 is an illustration of less accurate technology address to more accurate technology address translation in accordance with a second aspect of the present invention.

An example of this translation is illustrated in FIG. 2. The example is independent of location technology. Every location technology has an error margin that is usually described as a radius but can be any geometry. In the example below we use the White House as the Most Accurate Technology Address, i.e., we are assuming the president is carrying a device that provides information on his location via GPS but he has just entered the White House and the device is no longer able to get More Accurate Technology Addresses due to the GPS satellite signals being blocked by the building structure of the White House. In this example, the location device is still able to detect cell tower signals. The cell tower signals are able to be used to create the Less Accurate Technology Address, which is based on a cell tower at the center of circle #1. The most recent GPS generated address represents the More Accurate Technology Address, which is at the center of circle #2. The Less Accurate Technology Address is indicating that the device the president is carrying is somewhere within a circle #1 of Radius R1. This same information can be translated to indicate that the device the president is carrying somewhere within a circle #2 of Radius R2, where R2=R1+D and D is the distance between the center of circle R1 and the center of circle R2. The address of circle #2 is more likely to be more accurate and relevant to the user than the address of circle #1 since the error radius of the More Accurate Technology Address is smaller than the error Radius of the Less Accurate Location Address.

Having a More Accurate Technology Address can helps users understand more quickly the general area a device is located since they will be more likely to recognize where the More Accurate Location Address is, since it is likely that it is closer to the actual location of the device. This invention applies to all location technologies with an error margin, including but not limited to GPS, WiFi, and Cellular.

Figure 2A:
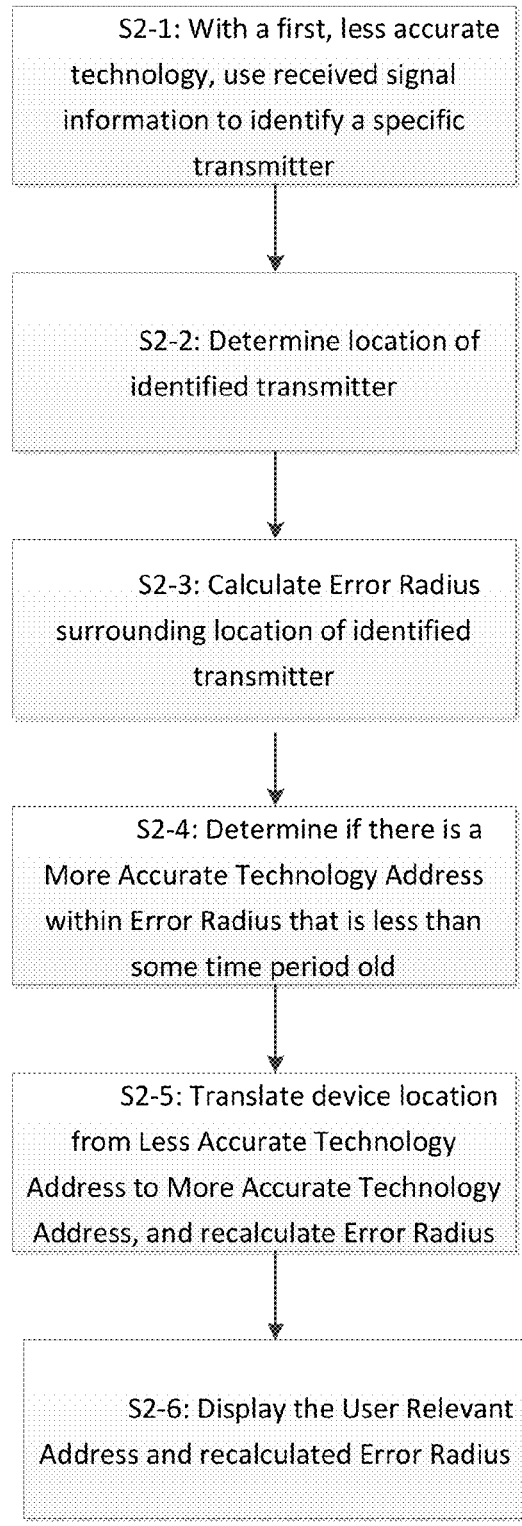
FIG. 2A is a flowchart depicting an illustrative method for less accurate technology address to more accurate technology address translation.

FIG. 2A is a flowchart that summarizes the process described above. As shown, the process includes steps S2-1 through S2-6:

S2-1: With a first, less accurate technology (e.g., downlink cellular signals), use received signal information to identify a specific transmitter (e.g., a closest cell site or closest WiFi access point).

S2-2: Determine the location of the identified transmitter. For example, this may be accomplished using a publicly available database that maps transmitter identifiers to geographic locations.

S2-3: Calculate an Error Radius surrounding the location of the identified transmitter.

S2-4: Using the Error Radius, determine if there is a more accurate technology location within the margin of error of the location technology that is less than some time period old.

S2-5: If there is a More Accurate Technology Location Address, translate the device location from the Less Accurate Technology Address to the More Accurate Technology Address and recalculate the error margin based on the Error Radius of the Less Accurate Technology Address and the distance between the More Accurate and Less Accurate Technology Addresses. This translation creates an Address with a higher probability of being closer to the device than the Less Accurate Technology Address but only for a limited amount of time.

S2-6: Display the User Relevant Address and recalculated Error Radius to the user.

Illustrative Environment

Figure 3:
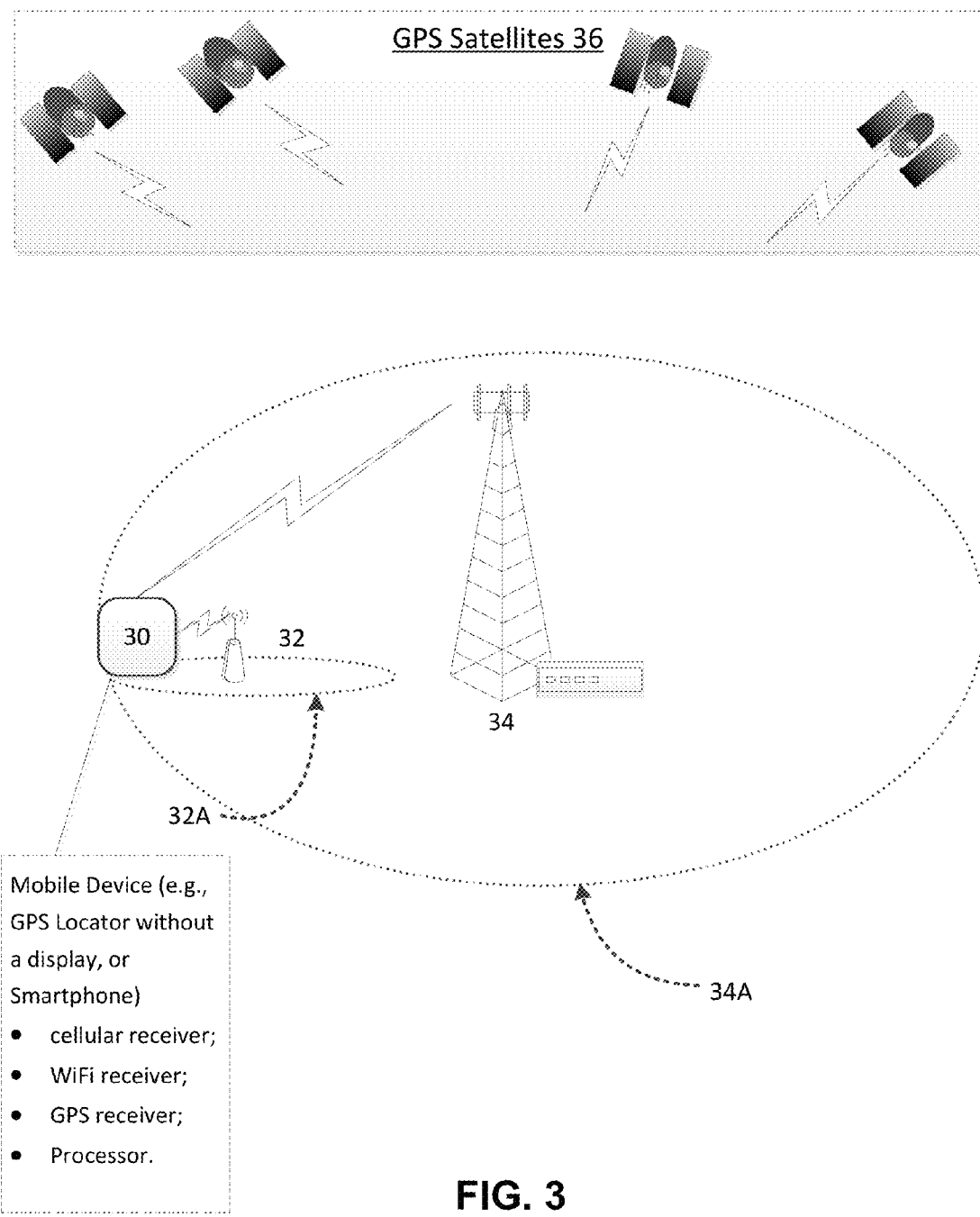
FIG. 3 depicts an illustrative environment in which the present invention may be employed.

FIG. 3 depicts an illustrative environment for the present invention. As shown, a mobile device 30, which could be a smartphone or other mobile computing device, includes the radio technology for receiving radio signals from a Wi-Fi access point 32, cellular base transceiver station 34, and a constellation of GPS satellites 36. The mobile device 30 may also be configured with to receive signals from a terrestrial broadcast station, such as a digital television transmitter, which could also be used for location calculation purposes. In one example, the mobile device is programmed with software to perform the inventive processing for translating technology relevant addresses to user relevant addresses, and for translating less accurate location addresses to more accurate location addresses. However, it should be noted that the translation process can also be accomplished by an independent computing system separate from the mobile device. This could be any type of computing device such as translation software running on a cloud computer or server or personal computer, for example, a machine to machine software platform running on a server in a location remote from the device being located. These translated addresses may be displayed to the end user carrying the mobile device 30, or they may be communicated to a third party, e.g., using the cellular or Wi-Fi radio technologies in the device. As mentioned, the translation may be performed by a computing device separate from the device to be located. The location information may not originate on the device to be located and may only be known by a separate computing environment.

We claim:

1. An improved method for displaying location information relating to a mobile device capable of receiving signals from one or more transmitters, comprising:
   using a first, less accurate technology, receiving signal information and using the received signal information to identify a specific transmitter;
   determining a location of the identified transmitter in the form of a Less Accurate Technology Address;
   calculating an Error Radius surrounding the Less Accurate Technology Address;
   determining if there is a More Accurate Location Technology Address within the Error Radius surrounding the Less Accurate Technology Address that is less than some time period old;
   if there is a More Accurate Location Technology Address, translating the Less Accurate Technology Address to the More Accurate Location Technology Address and recalculating the Error Radius; and
   displaying the More Accurate Location Technology Address and recalculated Error Radius on the mobile device or on a display remote from the mobile device;
   wherein the Error Radius is recalculated based on a distance separating the Less Accurate Technology Address and the More Accurate Location Technology Address, and wherein the translation creates an address with a higher probability of being closer to the mobile device than the Less Accurate Technology Address but only for a limited period of time.

2. A mobile device, comprising a cellular receiver, a WiFi receiver, a GPS receiver, a processor, and a display; wherein the processor is configured to perform the following steps for displaying location information:
   using a first, less accurate technology, receiving signal information and using the received signal information to identify a specific transmitter;
   determining a location of the identified transmitter in the form of a Less Accurate Technology Address;
   calculating an Error Radius surrounding the Less Accurate Technology Address;
   determining if there is a More Accurate Location Technology Address within the Error Radius surrounding the Less Accurate Technology Address that is less than some time period old;
   if there is a More Accurate Location Technology Address, translating the Less Accurate Technology Address to the More Accurate Location Technology Address and recalculating the Error Radius; and
   displaying the More Accurate Location Technology Address and recalculated Error Radius;
   wherein the Error Radius is recalculated based on a distance separating the Less Accurate Technology Address and the More Accurate Location Technology Address, and wherein the translation creates an address with a higher probability of being closer to the mobile device than the Less Accurate Technology Address but only for a limited period of time.

3. An improved method for displaying location information relating to a mobile device, comprising:
- at the mobile device, receiving signals from one or more transmitters, and sending received signal information from the mobile device to a computing environment remote from the mobile device;
- in the remote computing environment, using the received signal information to identify a specific transmitter;
- in the remote computing environment, determining a location of the identified transmitter;
- in the remote computing environment, determining a Technology Relevant Address based on the transmitter location;
- in the remote computing environment, calculating an Error Radius surrounding the Technology Relevant Address;
- in the remote computing environment, translating the Technology Relevant Address to a User Relevant Address;
- in the remote computing environment, recalculating the Error Radius; and
- sending the User Relevant Address and recalculated Error Radius to a device configured to display the User Relevant Address and recalculated Error Radius;
- wherein the specific transmitter identified is a closest cell site or a closest WiFi access point; wherein the location determination is accomplished using a database that maps transmitter identifiers to geographic locations; and wherein the Error Radius is recalculated based on a distance separating the Technology Relevant Address and the User Relevant Address.

* * * * *